US012640030B2

(12) United States Patent
Meah et al.

(10) Patent No.: US 12,640,030 B2
(45) Date of Patent: May 26, 2026

(54) ALARM CALL POINT

(71) Applicant: TYCO Fire & Security GmbH, Neuhausen am Rheinfall (CH)

(72) Inventors: Moosa Farook Meah, Woking (GB); Andreas Brenner, Marquarstein (DE)

(73) Assignee: TYCO Fire & Security GmbH, Neuhausen am Rheinfall (CH)

(*) Notice: Subject to any disclaimer, the term of this patent is extended or adjusted under 35 U.S.C. 154(b) by 43 days.

(21) Appl. No.: 18/599,069

(22) Filed: Mar. 7, 2024

(65) Prior Publication Data

US 2024/0304079 A1 Sep. 12, 2024

(30) Foreign Application Priority Data

Mar. 7, 2023 (EP) ..................................... 23160598

(51) Int. Cl.
G08B 29/12 (2006.01)
G06K 7/10 (2006.01)

(52) U.S. Cl.
CPC ......... G08B 29/12 (2013.01); G06K 7/10297 (2013.01)

(58) Field of Classification Search
CPC ........ G08B 29/12; G08B 29/14; G08B 25/12; G06K 7/10297
See application file for complete search history.

(56) References Cited

U.S. PATENT DOCUMENTS

| | | | |
|---|---|---|---|
| 3,562,730 A | 2/1971 | Hill et al. | |
| 4,725,818 A | 2/1988 | Motyka et al. | |
| 4,803,467 A * | 2/1989 | Peters | E05B 45/10 200/61.66 |
| 5,898,368 A | 4/1999 | Handley et al. | |
| 6,380,850 B1 | 4/2002 | Parker | |
| 6,737,967 B2 | 5/2004 | Farley | |
| 7,042,349 B2 | 5/2006 | Bergman et al. | |
| 9,767,679 B2 | 9/2017 | Piccolo et al. | |
| 2007/0194907 A1 | 8/2007 | Tawil | |
| 2008/0072314 A1 | 3/2008 | Frenette | |
| 2009/0184816 A1 | 7/2009 | Hosey | |
| 2014/0240105 A1 | 8/2014 | Brenner | |
| 2014/0266675 A1 | 9/2014 | Piccolo et al. | |
| 2014/0266677 A1 | 9/2014 | Piccolo et al. | |
| 2015/0206421 A1 | 7/2015 | Moffa | |
| 2015/0279201 A1 | 10/2015 | Brenner et al. | |
| 2017/0092114 A1 | 3/2017 | Barrieau et al. | |

(Continued)

FOREIGN PATENT DOCUMENTS

| | | | |
|---|---|---|---|
| CA | 1176724 A | 10/1984 | |
| CA | 1269140 C | 5/1990 | |

(Continued)

OTHER PUBLICATIONS

Extended European Search Report issued in corresponding European Patent Application No. EP23160598 dated Aug. 28, 2023.

*Primary Examiner* — Nay Tun
(74) *Attorney, Agent, or Firm* — ArentFox Schiff LLP

(57) ABSTRACT

The present disclosure provides an alarm call point which is able to discriminate between activation in an alarm situation and activation in a test situation (e.g. activation using a test key). This arrangement allows an alarm system to be tested without needing to put the control panel into a special test mode, making it easier and quicker to install, commission and test the system.

11 Claims, 4 Drawing Sheets

(56) References Cited

U.S. PATENT DOCUMENTS

| | | | |
|---|---|---|---|
| 2017/0152677 A1* | 6/2017 | Klammer | E05B 47/0044 |
| 2018/0107196 A1 | 4/2018 | Bian et al. | |
| 2018/0308475 A1 | 10/2018 | Locke et al. | |
| 2018/0365973 A1 | 12/2018 | Babich | |
| 2020/0066125 A1 | 2/2020 | Boguslawski et al. | |
| 2020/0394900 A1* | 12/2020 | Lontka | G06T 7/0002 |
| 2021/0142653 A1 | 5/2021 | Miagkov et al. | |
| 2021/0332611 A1* | 10/2021 | Yamashita | E05B 47/0603 |
| 2022/0108594 A1 | 4/2022 | Farley et al. | |
| 2022/0181707 A1 | 6/2022 | Feltham et al. | |
| 2023/0282096 A1* | 9/2023 | Kunze | G08B 29/043 |
| | | | 340/577 |
| 2024/0312333 A1* | 9/2024 | La Salle | H01H 37/585 |
| 2025/0061798 A1 | 2/2025 | Campbell et al. | |
| 2025/0218278 A1 | 7/2025 | Bouchard et al. | |

FOREIGN PATENT DOCUMENTS

| | | | |
|---|---|---|---|
| CN | 111537871 A | 8/2020 | |
| CN | 112286093 A | 1/2021 | |
| DE | 102007020282 A1 | 11/2008 | |
| DE | 102024120119 A1 | 6/2025 | |
| EP | 1988525 A2 | 11/2008 | |
| EP | 2727873 A1 | 5/2014 | |
| EP | 2879105 A1 | 6/2015 | |
| GB | 2289968 A | 12/1995 | |
| GB | 2513733 A | 11/2014 | |
| IN | 201844019309 | 12/2018 | |
| IN | 202017046331 | 2/2021 | |
| WO | 2004/097762 A1 | 11/2004 | |
| WO | 2010/020032 A1 | 2/2010 | |
| WO | 2012/010313 A1 | 1/2012 | |
| WO | 2015/048894 A1 | 4/2015 | |

* cited by examiner

100

ALARM CALL POINT

CROSS-REFERENCE APPLICATION

This application claims priority to, and the benefit of, European Patent Application No. 23160598.1, filed on Mar. 7, 2023, the disclosures of which are hereby incorporated by reference in their entireties.

FIELD OF INVENTION

The present invention relates to an alarm call point. The present invention also relates to an alarm system including an alarm call point and an external device, such as a control panel.

BACKGROUND

Alarm call points or pull stations typically have a feature which allows them to be tested by a technician using a 'test key' without actually breaking the glass or the device which would normally be pressed or actuated in the event of a real alarm activation. When a test of an alarm call point is to be performed, a control panel that is connected to the alarm call point is put into a special test mode. Once in this mode, the control panel will not trigger any alarm actions (e.g. activating a sounder) if it receives an alarm signal from the call point being tested.

SUMMARY OF INVENTION

The present invention provides an alarm call point which is able to discriminate between activation in an alarm situation and activation in a test situation (e.g. activation using a test key). This arrangement allows an alarm system to be tested without needing to put the control panel into a special test mode, making it easier and quicker to install, commission and test the system.

According to an aspect of the present invention, there is provided an alarm call point comprising: a controller; a first sensing device configured to provide a first output to the controller in response to sensing a first input, the first output indicating an alarm condition; and a second sensing device configured to provide a second output to the controller in response to sensing a second input, the second output indicating that the alarm call point is in a test mode. The controller is configured to, in response to receiving the first output and the second output, output a test signal to an external device.

The second sensing device may comprise a second mechanical switching device. The second sensing device may be configured to provide the second output in response to the second mechanical switching device being actuated by a key.

The first sensing device may comprise a first mechanical switching device. The first sensing device may be configured to provide the first output in response to the first mechanical switching device being actuated by a key. The first mechanical switching device and the second mechanical switching device may be arranged so that they can be actuated by the same key in use.

The second sensing device may comprise an optical switching device. The second sensing device may be configured to provide the second output in response to sensing the insertion of a key into a recess in the alarm call point.

The first sensing device may comprise a first mechanical switching device. The first sensing device and the second sensing device may be arranged within the recess such that when the first mechanical switching device is actuated by a key in use, the optical switching device senses the insertion of the same key.

The second sensing device may comprise a wireless communication device configured to receive an identifier. The second sensing device may be configured to provide the second output in response to receiving an identifier associated with a user, the second output including the identifier. The controller may be configured to receive the second output including the identifier and, in response to determining that the identifier corresponds to an identifier of an authorized user, output the test signal.

The wireless communication device may comprise a radio-frequency identification (RFID) tag reader configured to receive the identifier from an RFID tag.

The first sensing device may comprise a first mechanical switching device arranged to be actuated by a key.

According to another aspect of the present invention, there is provided an alarm system comprising: an alarm call point as set out above; and an external device. The external device is configured to receive the test signal from the alarm call point.

The external device may comprise a control panel.

The control panel may comprise a controller configured to, in response to receiving the test signal from the alarm call point, send an acknowledgment signal to the alarm call point. The controller of the alarm call point may be configured to, in response to receiving the acknowledgment signal from the control panel, control an output device of the alarm call point to provide an output indicating that the acknowledgment signal has been received.

The controller of the control panel may be configured to, in response to receiving the test signal from the alarm call point, send an acknowledgment signal to a cloud processing system.

The external device may comprise a mobile electronic device.

BRIEF DESCRIPTION OF THE DRAWINGS

The present disclosure will now be described by way of example only with reference to the accompanying drawings in which.

DETAILED DESCRIPTION

Figure 1:
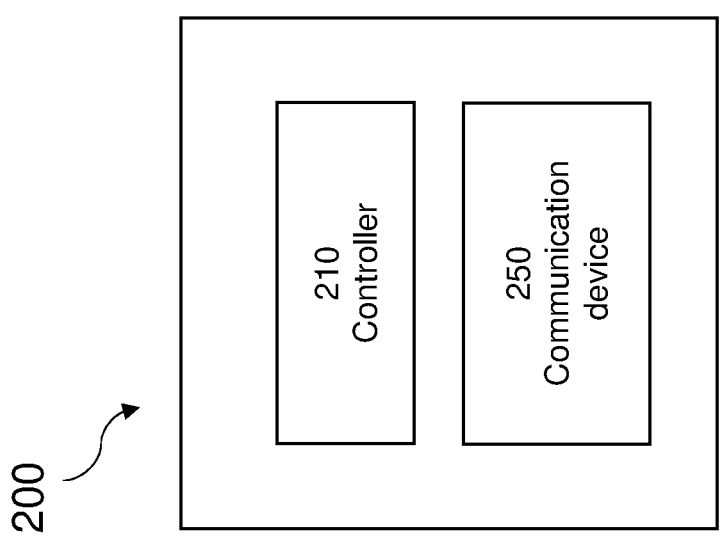
FIG. 1 is a block diagram showing a system including an alarm call point and a control panel.
Figure 1:
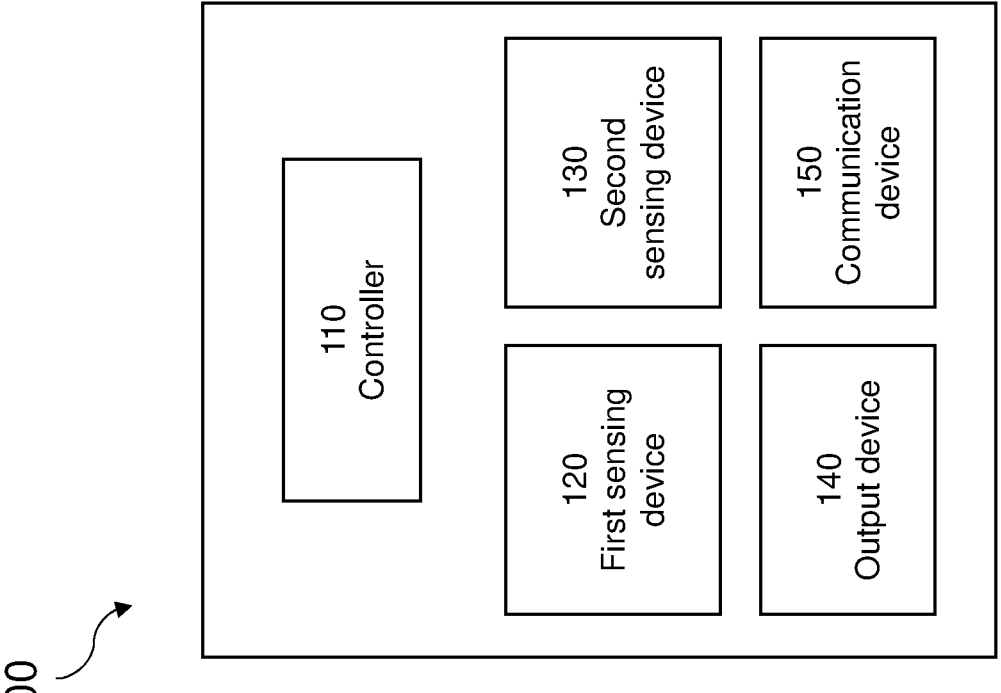

FIG. 1 shows an example of an alarm system including an alarm call point 100 and an external device 200. In the present example, the external device 200 is a control panel. In other examples, the external device may be a mobile device, such as a mobile telephone.

The alarm call point 100 includes a controller 110 which is configured to control the overall operation of the alarm call point 100. In particular, the controller 110 is configured to generate an alarm signal indicating that an alarm condition is present and send this alarm signal to the control panel 200 via a communication device 150. In the present example, the controller 110 includes a processor which is configured to execute computer-readable instructions to implement the functionality described herein. However, in other examples, the controller may be implemented using hardware.

The alarm call point 100 also includes a first sensing device 120 and a second sensing device 130. The first sensing device 120 is configured to provide a first output to the controller 110 in response to sensing a first input. The first output indicates that an alarm condition is present. The second sensing device 130 is configured to provide a second output to the controller 110 in response to sensing a second input. The second output indicates that the alarm call point 100 is in a test mode. When the controller 110 receives the first output only, the controller outputs an alarm signal to the control panel 200. However, when the controller 110 receives both the first output and the second output, the controller 110 outputs a test signal to the control panel 200. This indicates to the control panel 200 that the alarm call point is being tested and is working correctly.

The alarm call point 100 includes a housing (not shown) which covers and protects components of the alarm call point 100, such as the controller 110. The housing may include a recess into which a test key can be inserted to trigger the first sensing device 120 (and in some cases, the second sensing device 130) to provide an output.

In the present example, the alarm call point 100 includes an output device 140. The output device may be, for example, a light output device (e.g. a light-emitting diode) or a sound output device such as a speaker. In other examples, the output device 150 may be omitted.

The control panel 200 includes a controller 210 and a communication device 250 which allows the controller 210 to communicate with the alarm call point 100. When the controller 210 receives a test signal from the alarm call point 100, the controller 210 may respond by sending an acknowledgment signal to the alarm call point 100 via the communication device 250. In the present example, when the controller 110 of the alarm call point 100 receives the acknowledgment signal from the control panel 200, it can control the output device 140 to provide an output indicating that the acknowledgment signal has been received. For example, if the output device 140 is a light output device, the controller 110 may control the light output device to illuminate when the acknowledgment signal has been received. This provides a technician with an indication that the communication between the alarm call point 100 and the control panel 200 is working correctly.

Alternatively, or in addition, the controller 210 may send an acknowledgment signal to a cloud processing system (not shown) when it receives the test signal from the alarm call point 100. Based on this signal, the cloud processing system may record the fact that communication between the alarm call point 100 and the control panel 200 is working correctly.

Figure 2B:
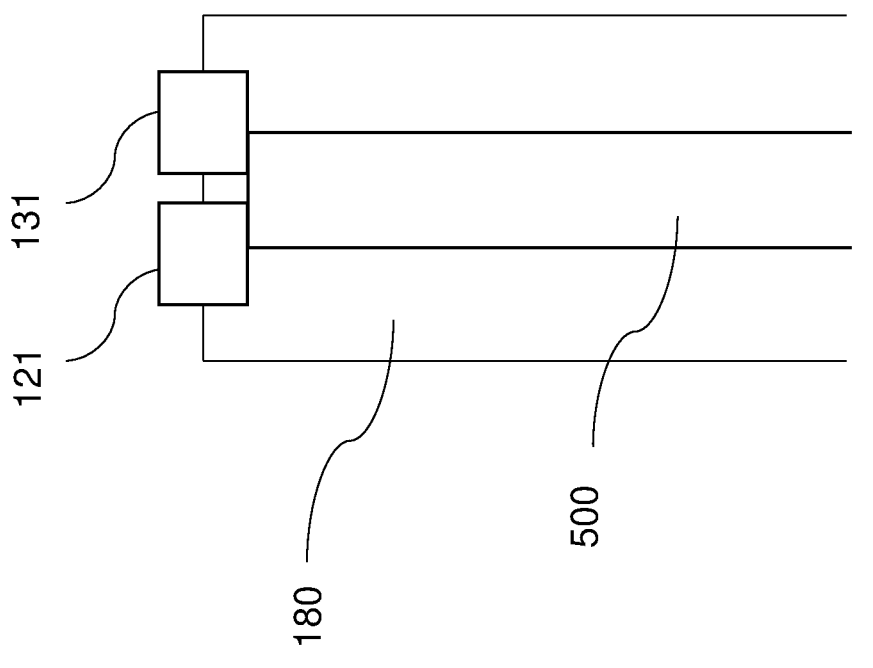
FIGS. 2A and 2B are schematic diagrams showing a sensing device according to an embodiment.
Figure 2A:
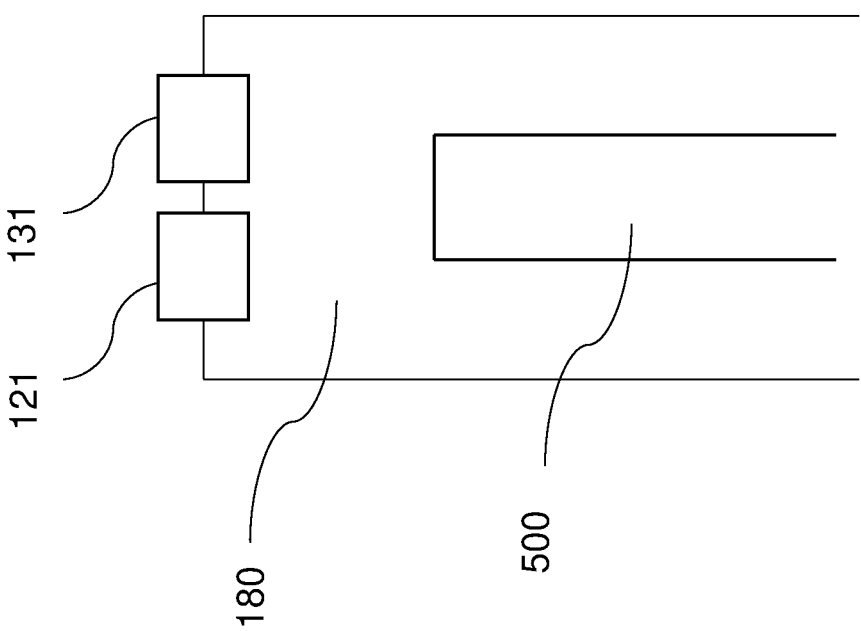

FIGS. 2A and 2B show an embodiment in which the first sensing device 120 includes a first mechanical switching device 121, and the second sensing device 130 includes a second mechanical switching device 131. One or both of the mechanical switching devices 121, 131 may be a microswitch. The mechanical switching devices 121, 131 are disposed within a recess 180 of the housing of the alarm call point 100. In the present example, the mechanical switching devices 121, 131 are disposed at the end of the recess 180 furthest from the opening of the recess 180.

Each of the mechanical switching devices 121, 131 can be actuated by a test key. In the present example, the first mechanical switching device 121 and the second mechanical switching device 131 are disposed adjacent to one another so that a single test key 500 can actuate both switching devices 121,131, as shown in FIG. 2B. When both switching devices 121,131 are actuated, the controller 110 outputs the test signal to the control panel 200. This arrangement allows a technician to test the alarm call point 100 while preventing subsequent alarm actions from being triggered by the control panel 200, using a single test key.

Figures 3A, 3B:
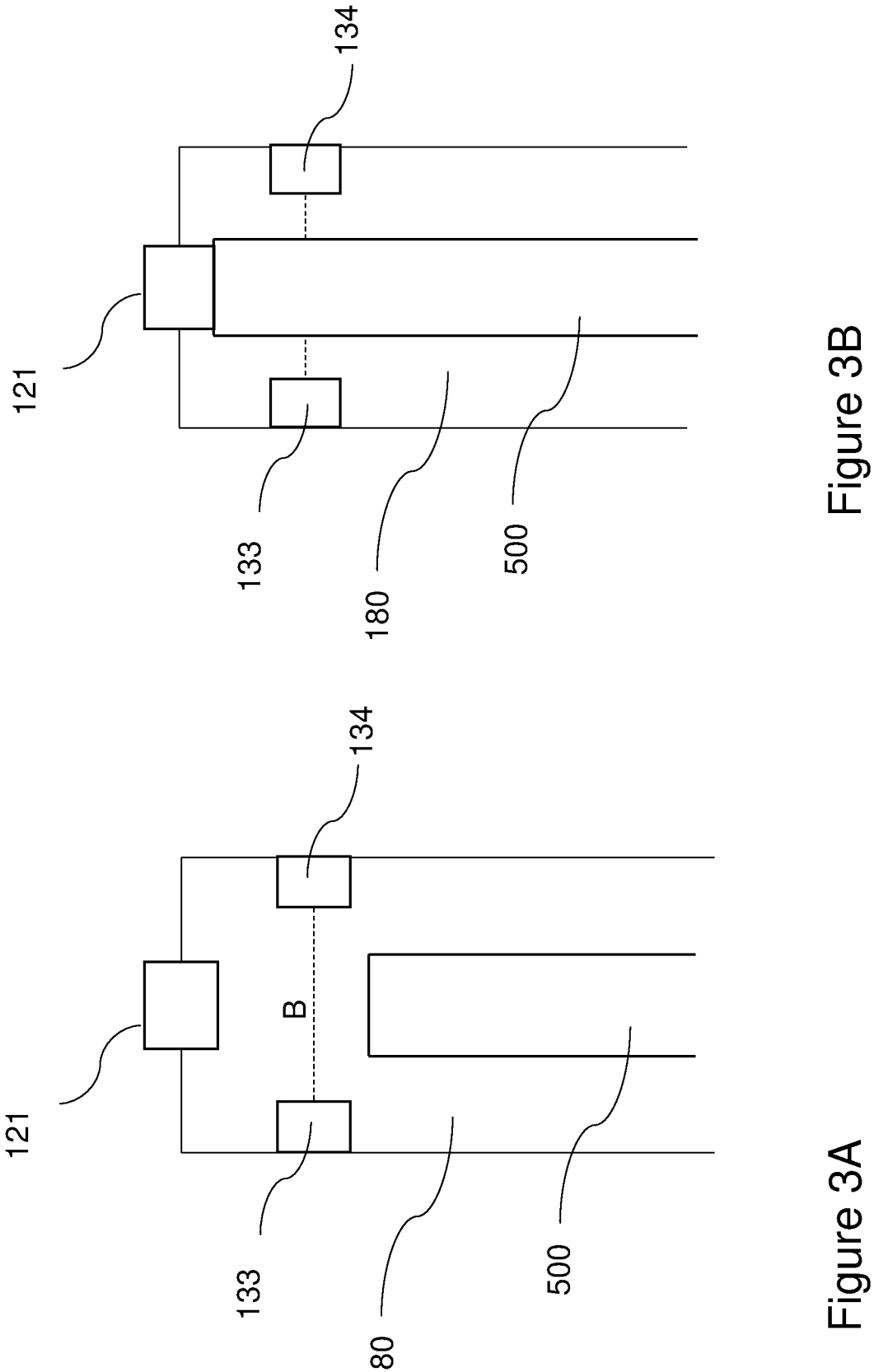
FIGS. 3A and 3B are schematic diagrams showing a sensing device according to an embodiment.

FIGS. 3A and 3B show an embodiment in which the first sensing device 120 includes a first mechanical switching device 121, and the second sensing device 130 includes an optical switching device. The optical switching device includes a light source 133 configured to emit light (e.g. a beam of light), and a photodetector 134 configured to detect light emitted by the light source 133. The light source 133 may be configured to emit any suitable wavelength of light, e.g. ultraviolet, visible or infrared light. In the present example, the light source 133 is configured to emit a beam of visible light. In other examples, the light source 133 may be configured to emit a beam of infrared light.

The mechanical switching device 121 and the optical switching device are disposed within a recess 180 of the housing of the alarm call point 100. In the present example, the mechanical switching device 121 is disposed at the end of the recess 180 furthest from the opening of the recess 180.

The light source 133 and the photodetector 134 are disposed so as to face each other. In the present example, the light source 133 and the photodetector 134 are disposed on opposite sides of the recess 180. A light beam B emitted by the light source 133 can be detected by the photodetector 134. When a test key 500 is inserted into the recess 180 it passes between the light source 133 and the photodetector 134, blocking the light beam from the light source 133 and preventing the light from reaching the photodetector 134.

In response, the second sensing device 130 outputs a signal to the controller 110 indicating that the test key has been inserted into the recess 180, and that the alarm call point 100 is in a test mode. Upon fully inserting the key 500 into the recess 180, the key 500 actuates the first mechanical switching device 121. The controller 110 then outputs the test signal to the control panel 200. This arrangement allows a technician to test the alarm call point 100 while preventing subsequent alarm actions from being triggered by the control panel 200, using a single test key.

Figure 4:
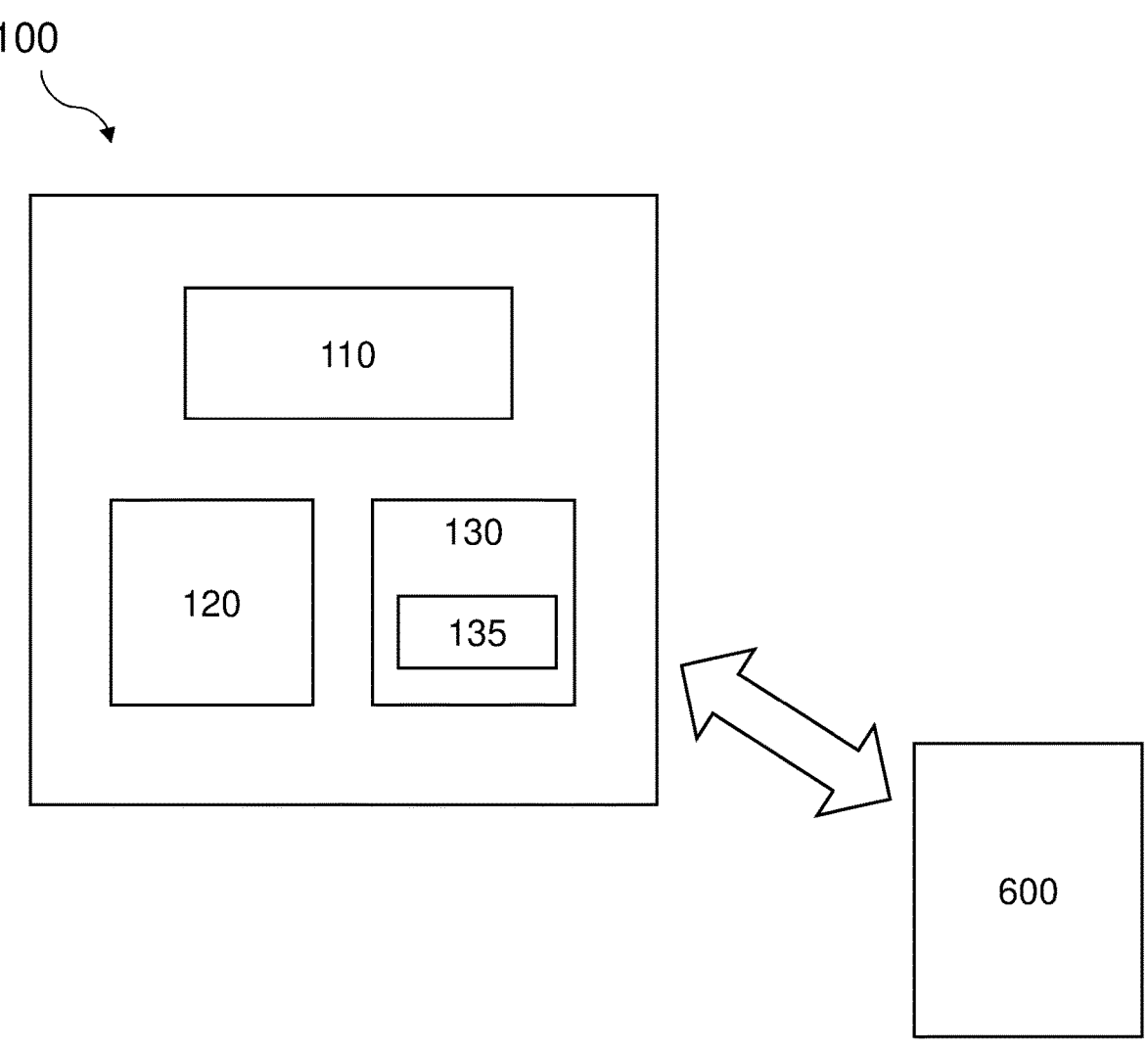
FIG. 4 is a schematic diagram showing a control panel including a sensing device according to an embodiment.

FIG. 4 shows an embodiment in which the second sensing device 130 includes a wireless communication device 135. The wireless communication device 135 is configured to receive an identifier. In the present example, the wireless communication device 135 is a radio-frequency identification (RFID) tag reader configured to receive the identifier from an RFID tag 600. Upon receiving an identifier, the RFID tag reader outputs the identifier to the controller 110.

The controller 110 receives the identifier and determines whether the identifier corresponds to an identifier of an authorized user of the alarm call point 100. If the controller 110 receives the output from the first sensing device 120 and additionally determines that the identifier corresponds to an identifier of an authorized user of the alarm call point 100, the controller 110 outputs the test signal to the control panel 200. This arrangement provides enhanced security, as means of identification is required for a technician to perform the test.

Although various examples of the second sensing device 130 have been described, the invention is not limited to these examples, and other types of sensing device may be used. For example, the second sensing device 130 may include a Hall effect switch which is triggered by a magnet on a test key to cause the second sensing device 130 to provide the output to the controller 110.

Various further modifications to the above described examples, whether by way of addition, deletion or substitution, will be apparent to the skilled person to provide additional examples, any and all of which are intended to be encompassed by the appended claims.

The invention claimed is:

1. An alarm call point comprising:
a controller;
a first sensing device configured to provide a first output to the controller in response to sensing a first input, the first output indicating an alarm condition; and
a second sensing device configured to provide a second output to the controller in response to sensing a second input, the second output indicating that the alarm call point is in a test mode;
wherein the controller is configured to, in response to receiving the first output and the second output, output a test signal to an external device;
wherein the second sensing device comprises a second mechanical switching device, wherein the second sensing device is configured to provide the second output in response to the second mechanical switching device being actuated by a key; and
wherein the first sensing device comprises a first mechanical switching device, wherein the first sensing device is configured to provide the first output in response to the first mechanical switching device being actuated by a key, and wherein the first mechanical switching device and the second mechanical switching device are configured to be actuated by the same key.

2. The alarm call point according to claim 1, wherein the second sensing device comprises an optical switching device, wherein the second sensing device is configured to provide the second output in response to sensing the insertion of a key into a recess in the alarm call point.

3. The alarm call point according to claim 2, wherein the first sensing device comprises a first mechanical switching device, wherein the first sensing device and the second sensing device are arranged within the recess such that when the first mechanical switching device is actuated by a key in use, the optical switching device senses the insertion of the same key.

4. The alarm call point according to claim 1, wherein the second sensing device comprises a wireless communication device configured to receive an identifier, wherein the second sensing device is configured to provide the second output in response to receiving an identifier associated with a user, the second output including the identifier, and
wherein the controller is configured to receive the second output including the identifier and, in response to determining that the identifier corresponds to an identifier of an authorized user, output the test signal.

5. The alarm call point according to claim 4, wherein the wireless communication device comprises a radio-frequency identification (RFID) tag reader configured to receive the identifier from an RFID tag.

6. The alarm call point according to claim 1, wherein the first sensing device comprises a first mechanical switching device arranged to be actuated by a key.

7. An alarm system comprising:
the alarm call point according to claim 1; and
an external device,
wherein the external device is configured to receive the test signal from the alarm call point.

8. The alarm system according to claim 7, wherein the external device comprises a control panel.

9. The alarm system according to claim 8,
wherein the control panel comprises a controller configured to, in response to receiving the test signal from the alarm call point, send an acknowledgment signal to the alarm call point, and
wherein the controller of the alarm call point is configured to, in response to receiving the acknowledgment signal from the control panel, control an output device of the alarm call point to provide an output indicating that the acknowledgment signal has been received.

10. The alarm system according to claim 8, wherein the controller of the control panel is configured to, in response to receiving the test signal from the alarm call point, send an acknowledgment signal to a cloud processing system.

11. The alarm system according to claim 7, wherein the external device comprises a mobile electronic device.

* * * * *